United States Patent [19]

van Velzen et al.

[11] Patent Number: 4,668,490

[45] Date of Patent: May 26, 1987

[54] PROCESS AND A DEVICE FOR FLUE GAS DESULPHURIZATION

[75] Inventors: Daniel van Velzen, Brebbia; Heinrich W. Langenkamp, Cadrezzate, both of Italy

[73] Assignee: European Atomic Energy Community, Luxembourg

[21] Appl. No.: 752,877

[22] Filed: Jul. 8, 1985

[30] Foreign Application Priority Data

Jul. 6, 1984 [LU] Luxembourg .......................... 85454

[51] Int. Cl.⁴ ...................... C01B 17/00; C01B 17/82
[52] U.S. Cl. ..................................... 423/242; 423/522
[58] Field of Search ............... 423/242 A, 244 A, 522, 423/242 R

[56] References Cited

U.S. PATENT DOCUMENTS 3,374,061 3/1968 Topsoe et al. ...................... 423/522
4,029,751 6/1977 Dorr et al. .......................... 423/522

FOREIGN PATENT DOCUMENTS 2045218 10/1980 United Kingdom ................ 423/242

*Primary Examiner*—Gregory A. Heller
*Attorney, Agent, or Firm*—Sughrue, Mion, Zinn, Macpeak, and Seas

[57] ABSTRACT

The invention relates to a process and a device for flue gas desulphurization using the following reaction:

$$SO_2 + Br_2 + 2 H_2O \rightarrow H_2SO_4 + 2 HBr$$

The hydrobromic acid thus formed is split up by electrolysis into hydrogen and bromine. The sulphuric acid thus produced is brought to a saleable concentration rate of at least 90% in two successive concentrators (1, 2), the post-concentrator being fed with high temperature flue gases which are withdrawn immediately behind the economizer of the power plant.

A partial flow of the flue gases to be cleaned traverses a heat exchanger (6), in which the cleaned flue gases are reheated to a temperature level which is compatible with the chimney requirements.

3 Claims, 1 Drawing Figure

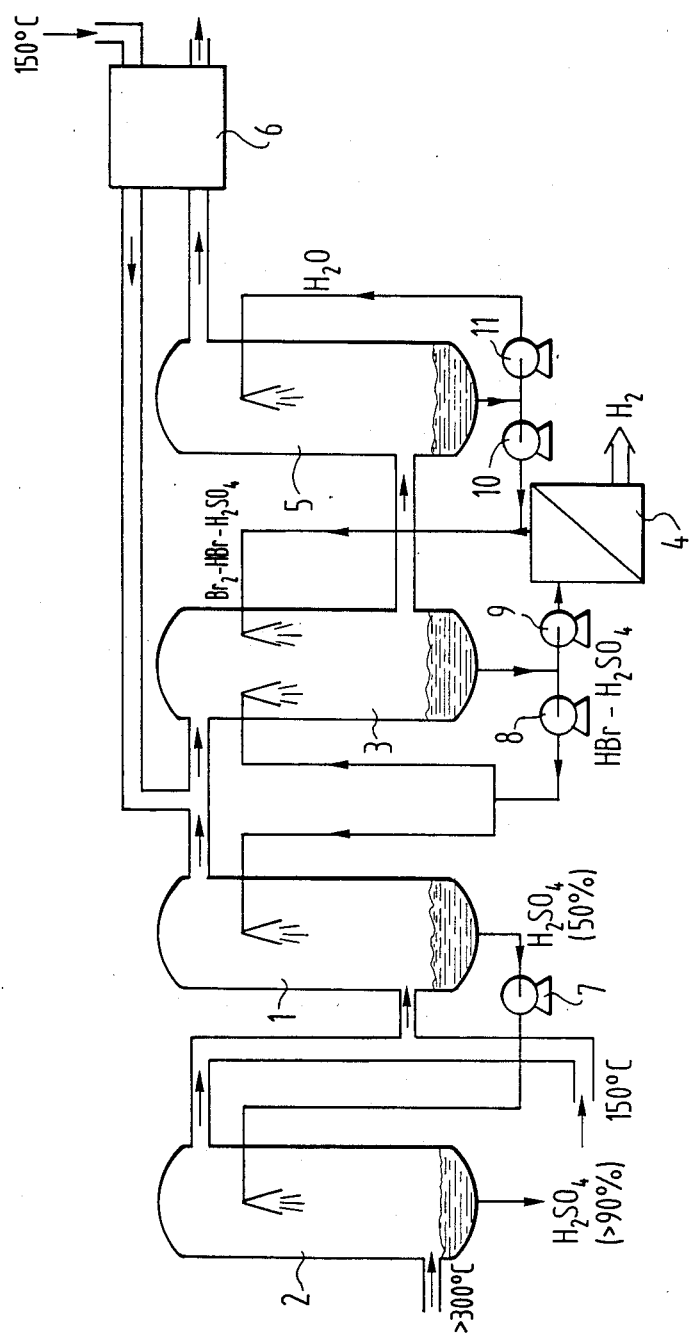

PROCESS AND A DEVICE FOR FLUE GAS DESULPHURIZATION

The invention relates to a process and a device for flue gas desulphurization, in which the sulphur dioxde and an aqueous bromine solution are converted in a reactor traversed by the flue gases into sulphuric acid and hydrobromic acid, and then the hydrobromic acid is submitted to an electrolysis, during which hydrogen and bromine are formed, the latter of which can be reinjected into the reactor. The hydrobromic acid is separated from the sulphuric acid by evaporation in a concentrator through which the hot flue gases flow.

Such a process and such a device are known from the document EP-B1 0016 290. In this case, a sulphuric acid of a concentration higher than 80% by weight is produced, as long as the temperature of the flue gases is at least 180° C. In modern power plants, however, this condition is not always fulfilled, as on the one hand, for reasons of pollution control, the exhaust temperatures at the chimney exit are lowered as much as possible, and on the other hand, the exhaust temperatures depend strongly on the charge factor of the power plant. Thus, the exhaust temperature, which is 150° C. at full charge, can sink to 100° C. at a charge factor of 0.3. It is clear that with such low exhaust temperatures, the concentrator heated by the flue gases looses most of its efficiency and that the sulphuric acid concentration of at least 75% by weight, which is needed for a saleable product, cannot be reached any more.

It is an object of the invention to supply a process and a device of the kind mentioned above, in which a high concentration rate of the sulphuric acid is maintained even at low charge rates.

This object is achieved according to the invention by submitting the sulphuric acid obtained in the concentrator to another evaporation step in a post-concentrator, which is traversed by gases at a temperature which is essentially higher than that of the flue gases.

Accordingly, the device for flue gas desulphurization is characterized according to the invention in that the concentrator is followed by a post-concentrator into which gases of an essentially higher temperature level than the flue gases are fed.

The invention will now be described more in detail with reference to the drawings which show schematically a preferred embodiment of the device according to the invention.

The device consists of six main units, i.e. a pre-concentrator 1, a post-concentrator 2, a reactor 3, an electrolytical cell 4, a washing column 5 and a heat exchanger 6. A small partial flow of the flue gases to be cleaned flows through the pre-concentrator 1, the reactor 3, the washing column 5 and the heat exchanger 6 in series. The greater part thereof flows first through the heat exchanger 6, in order to heat up the cleaned flue gases to a temperature which is optimal for the chimney, and is then added to said small partial flow at the inlet of the reactor. The post-concentrator 2 is fed with high temperature flue gases, which are withdrawn immediately downstream of the economiser of the thermal power plant (not represented in the drawings). After having flowed through this concentrator, these gases are added to the flue gases entering the pre-concentrator 1. Alternatively, hot air coming from an air-preheater of the power plant could be used to this effect.

In the concentrators 1 and 2, the hydrobromic acid is evaporated out of the heated mixture of acids and is carried along with the flue gases, while the sulphuric acid with a higher boiling point becomes concentrated. In the reactor, the flue gases get into contact with bromine dissolved in water, so that the following reaction takes place:

$$SO_2 + Br_2 + 2H_2O \rightarrow H_2SO_4 + 2HBr$$

i.e. the result is the above mentioned mixture of acids. In order to intensify this contact, the mixture is continuously circulated and again and again sprayed around in the reactor. A part of this mixture is continuously injected into the preconcentrator and another part is fed into the electrolysis cell 4. This cell is supplied with constant current via graphite electrodes and splits up hydrobromic acid HBr into molecular bromine and hydrogen. The bromine gets back into the reactor together with the rest of the mixture, while the hydrogen is collected as a saleable product.

In the washing column 5, water is injected from above in a closed circuit, while the cleaned flue gases flow through the column in a countercurrent manner. The loss of water resulting from evaporation in the reactor 3 and which would lead to a higher water level in the washing column, is compensated for by repumping part of the water from the washing column into the reactor. In the usual way, the liquids to be fed into the concentrators, the reactor and the washing column are compressed by pumps 7 and 11 to an adequate injection pressure.

In the following, operation parameters of a pilot plant are presented, which is capable of cleaning an exhaust flow rate of 20.000 m$^3$/h. The flow rate indications refer to normal pressure and ambient temperature. The values for full charge and for a partial charge (charge factor of 0.3) are indicated side by side. The flue gases to be cleaned have the following composition:

nitrogen 72.9/75 vol.%
carbon dioxide 14/11 vol.%
water 9/5 vol.%
oxygen 4/9 vol.%
sulphur dioxide 790/470 ppm
total flue gas flow 20.000/6.000 m$^3$/h.

Of the total flue gas flow, 66.3/64.4 vol.% enter into the heat exchanger, 32.0/33.1 vol.% enter into the main concentrator and 1.7/2.5 vol.% come from the economiser of the power plant and enter into the post-concentrator.

The temperature of the original flue gases upstream of the heat exchanger is 150°/100° C. and downstream thereof 90°/75° C. The temperature of the cleaned flue gases upstream of the heat exchanger is 41.7°/30.9° C. and downstream thereof 82°/47° C. The concentration of sulphuric acid in the main concentrator in both cases is near 50%, and in the post-concentrator near 95%. Besides small amounts of molecular bromine, the reactor contains in both cases about 15% of hydrobromic acid and 15% sulphuric acid. The rest is water.

If a higher proportion of bromine is chosen, i.e. 20% hydrobromic acid and 10% sulphuric acid, a greater part, i.e. 51% of the total flue gas flow is chosen for the feeding into the concentrator 1 and a smaller part, i.e. 47.3%, for heating up to the cleaned flue gases. In this case, the latters enter the heat exchanger at a temperature of 41.7° C. and are heated up there to 70° C.

Although the detailed examples cited above are typical and advantageous for a pilot plant, the invention is not limited to these examples. In particular in a large installation, the subdivision of the total flue gases flow might be different, depending on the required minimum temperature of the cleaned flue gases at the inlet of the chimney. If, for example, the temperature of the cleaned flue gases at the outlet of the heat exchanger is required to be 100° C., 71% of the flue gases to be cleaned can be used for heating up the cleaned flue gases in the heat exchanger, and 23% can be fed into the main concentrator and 6% into the post-concentrator.

We claim:

1. A process for flue gas desulphurization comprising the steps of:

(A) converting sulphur dioxide and an aqueous bromine solution, in a reactor traversed by flue gases, into sulphuric acid and hydrobromic acid;
   (B) separating the sulphuric acid from the hydrobromic acid by evaporation in a first concentrator through which the flue gases flow;
   (C) subjecting the sulphuric acid obtained to further evaporation in a second concentrator which is traversed by gases having a temperature which is essentially higher than that of the flue gases; and
   (D) subjecting the hydrobromic acid obtained to electrolysis to form hydrogen and bromine, wherein the bromine can be reinjected into the reactor.

2. The process according to claim 1, wherein the temperature of said gases is between 250° and 400° C.

3. The process according to claim 1 or 2, wherein said gases are also flue gases, which, after flowing through the second concentrator, are fed into the flow of the flue gases which are to be cleaned.

* * * * *